March 23, 1937.  T. B. FLANAGAN  2,074,983
WEIGHING SCALE
Filed Nov. 30, 1934  2 Sheets-Sheet 1

Thomas B. Flanagan
INVENTOR

BY Corbett & Mahoney
ATTORNEYS.

March 23, 1937.  T. B. FLANAGAN  2,074,983
WEIGHING SCALE
Filed Nov. 30, 1934  2 Sheets-Sheet 2

Thomas B. Flanagan
INVENTOR.

BY
Corbett & Mahoney
ATTORNEYS.

Patented Mar. 23, 1937

2,074,983

UNITED STATES PATENT OFFICE 2,074,983

WEIGHING SCALE

Thomas B. Flanagan, Columbus, Ohio, assignor to The Exact Weight Scale Company, Columbus, Ohio, a corporation of Ohio Application November 30, 1934, Serial No. 755,407

16 Claims. (Cl. 265—58)

My invention relates to weighing scales. It has to do, more particularly, with that type of weighing scale commonly referred to as over-and-under weight scales, although there are features of my invention not necessarily limited thereto.

One of the objects of my invention is to provide a novel type of resistance element for a scale which operates in a very efficient manner and which is of such a nature and so arranged that it will readily withstand the stresses to which it is subjected and which is of such a nature that the scale will always weigh very accurately even after the resistance element has been used for a considerable length of time.

Another object of my invention is to provide a resistance element which is of a very simple nature, which can be readily mounted, and which is capable of a wide range of adjustment, it being possible to quickly and easily adjust it.

Another object of my invention is to provide a resistance element for a scale which is of such a nature that temperature variations will have no effect on the accuracy of the scale.

Another object of my invention is to provide a scale embodying a beam and indicating mechanism for indicating the position of the beam, and novel means for connecting the beam to the indicating mechanism in such a manner as to appreciably enhance the accuracy of the scale.

Another object of my invention is to provide connecting means for connecting the beam to the indicating mechanism which is of such a nature that it will be practically frictionless and free from any danger of binding and which is very durable.

In its preferred form, my invention contemplates the provision of a scale embodying a movable beam which has a novel type of resistance element for resisting movement of the beam away from balanced position. This resistance element preferably comprises two flexible strips of spring metal, which I shall term flexes, which are bowed into substantially U-shape. These flexes are so mounted that they oppose movement of the beam away from balanced position. They also oppose each other and when the beam is in balanced position they exactly balance each other. The flexes are so mounted that they may be readily adjusted to vary the resistance thereof.

I provide indicating mechanism for indicating the position of the beam and novel means for connecting the beam to the indicating mechanism so that it will operate such mechanism. This means embodies a gravity rod which has its upper end connected to the indicating mechanism, which is arranged above the level of the beam, and its lower end operated from the beam through the medium of a pin and cup bearing. The lower end of the rod is free, since the pin is merely held in the cup by gravity, and will automatically adjust itself to compensate for any distortion of the rod and other circumstances.

The preferred embodiment of my invention is illustrated in the accompanying drawings wherein similar characters of reference designate corresponding parts and wherein.

Figure 1:
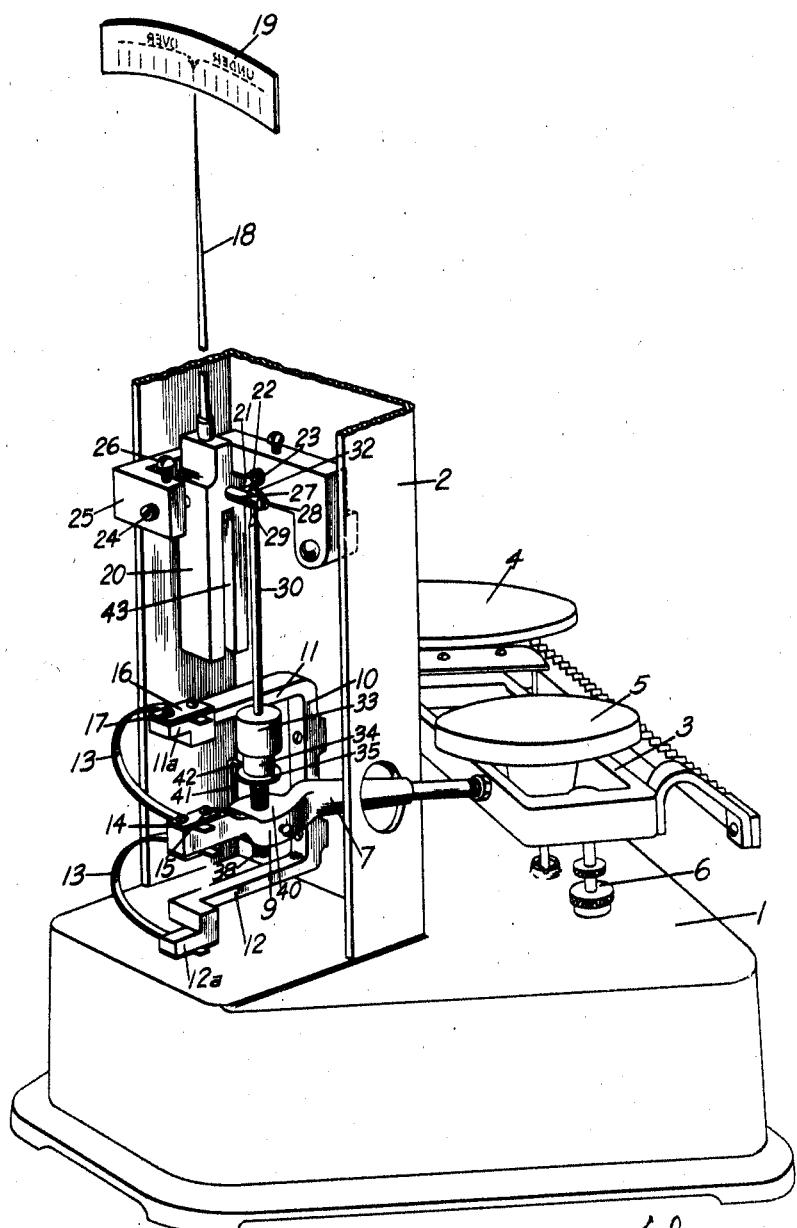
Figure 1 is a perspective view of a scale with a part of the tower housing removed to show the novel resistance element which I have provided and the novel means for connecting the indicating mechanism to the beam which I have provided.

With reference to the drawings, I have indicated a scale embodying a base 1 and a tower 2 disposed adjacent one end thereof. This tower is shown as being arranged at an angle on the base but it will be apparent that it may be located in different positions on the base.

The base 1 carries a beam 3 which is mounted thereon in the usual manner for vertical swinging movement about a suitable fulcrum point. This beam 3 carries outrider elements in the usual manner, one of which carries a commodity platform 4 and the other of which carries a weight platform 5. A dash pot 6 is disposed below one end of the beam and is operatively connected thereto.

One end of the beam 3 has a rigid extension 7 projecting laterally therefrom. This extension projects through a large opening in the wall of the tower 2 and extends into the tower as indicated. It will be understood that half of the tower housing has been removed in order to show the mechanism disposed therein. The extension 7 is provided with a portion 9 which is bent at an angle to the rest of the extension so that it will be substantially parallel to the side walls of the tower, being disposed substantially midway therebetween, and will be substantially at right angles to the front and rear walls of the tower.

In the lower end of the tower, a yoke member 10 is rigidly secured in position by attaching it in a suitable manner to one wall of the tower. This yoke member 10 has its legs 11 and 12 spaced vertically apart a considerable distance. Each of the legs 11 and 12 of the yoke has an L-shaped portion on its outer end so that the extreme outer ends 11a and 12a of the legs lie substantially in the same vertical plane as the portion 9 on the extension 7 of the beam, but the main portions of the legs are off-set to one side of portion 9 of the extension. When the beam is in balanced position, the portion 9 of the extension will lie substantially midway between the level of the legs 11 and 12 of the yoke.

The resistance element for resisting movement of the beam away from balanced position embodies a pair of flexes 13 which are formed of flat strips of metal. They are preferably made of blue tempered Swedish spring steel or other suitable material. Each of these flexes is bowed into substantially U-shape and has one leg attached to the beam extension and its other leg attached to one leg of the yoke member 10. As shown in the drawings, one of these U-shaped flexes is arranged above the beam extension and the other below the beam extension.

Both of these flexes are mounted in identically the same way so I will describe how the upper flex only is attached to the beam extension and the leg of the yoke member. The outer end of the beam extension is flattened and has a small plate 14 secured thereto by means of screws 15. The end of the flex 13 passes between this plate 14 and the flat surface of the beam extension and may be clamped therebetween by tightening screws 15. The leg 11 of the yoke member is provided with a flattened upper surface adjacent its outer end upon which is superimposed a small plate 16 held in position by screws 17. The upper end of the flex 13 will pass between these members and may be clamped between them.

Figure 3:
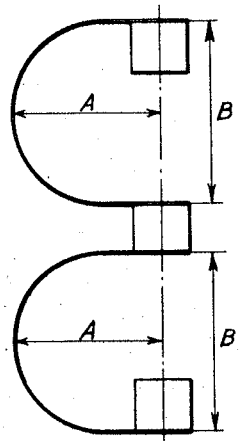
Figure 3 is a diagram illustrating how the two U-shaped flexes should be adjusted.

The flexes 13 are made from identical strips of metal and are so adjusted that the resistance of one will equal the resistance of the other when in the positions indicated in Figure 1, that is, when the beam is in balance. The two flexes balance each other when the beam is in balance. The resistance of these flexes may be readily adjusted by changing the effective length thereof, or in other words, the distance indicated by the line A of the diagram of Figure 3. This may be easily done by loosening the plate 16 and slipping the end of the flex 13 one way or the other and then again clamping the end in position. It will be apparent that the greater the distance A is, the less the resistance of the U-shaped flex will be since greater leverage will be provided for flexing the legs thereof, and vice versa. However, as illustrated by the diagram in Figure 3, the distance A of one of the flexes should equal the distance A of the other flex and the distance B of one of the flexes should equal the distance B of the other flex. The flexes may be readily adjusted to accomplish this, in the manner previously described and which will be readily apparent.

As previously stated, the flexes exactly balance each other when the beam is in balance. However, if the beam moves downwardly the ends of the lower flex will be forced closer together and the ends of the upper flex will be permitted to spread farther apart. The lower flex will thus resist downward movement of the beam. When the beam moves upwardly, the reverse action takes place and the upper flex resists upward movement of the beam away from balanced position. The flexes are only subjected to stresses which will bow them longitudinally of themselves and because they are comparatively long and narrow strips of metal, these stresses will have no injurious effect on the flexes and will not cause crystallization thereof. Another advantage of this resistance element resides in the fact that temperature variations will have no effect thereon. If the temperature varies it will affect the individual flexes but since they oppose each other and balance each other there will be no effect on the operation of the resistance element as a whole. Furthermore, the flexes are capable of a wide variation of adjustment.

The two flexes exert their resistance force directly on the extension of the beam which, in reality, is a part of the beam. Because of this, it is possible to provide the novel means, which I will now describe, for connecting the beam to the indicating mechanism.

As shown in the drawings, the indicating mechanism embodies a pointer 18 which is disposed in the upper part of the tower and is mounted in such a manner that it may swing across a chart 19 mounted in the extreme upper end of the tower in a suitable manner (not shown). The lower end of the pointer is supported on the upper end of a weight member 20. Adjacent the upper portion of this weight member, pivot pins 21 extend laterally therefrom and have points 22 formed on their outer ends. These points 22 fit into cups 23 formed in the inner ends of bearing members 24. The bearing members 24 are supported by a yoke member 25 which is suitably fastened to one wall of the tower. These bearing members are threaded into the yoke member and are readily adjustable. They may be held in adjusted position by set screws 26, as indicated. By proper adjustment of the bearing members 24, the points 22 will be properly seated in the cups 23. Since pin and cup bearings are provided, there is no danger of the ends of the pins jumping out of the bearings during movement of the indicator pointer 18.

The greater portion of the weight 20 will be disposed below the point where it is readily mounted on the yoke member 25. However, the weight of that portion of weight 20 which is below the pivot point equals the weight of that portion thereof which is above the pivot point together with the weight of the indicator pointer 18. In other words, the indicator is exactly in balance.

Figure 2:
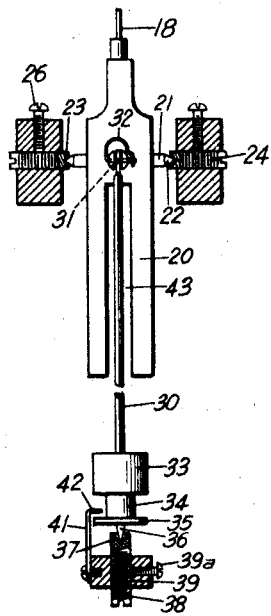
Figure 2 is a view partly in side elevation and partly in section illustrating the mechanism for connecting the indicating mechanism to the beam.

The weight 20 has a pin 27 projecting therefrom at right angles to the center line which passes through the aligning pivot pins 21. This pin 27 and the pins 21 are in the same horizontal plane. The outer end of this pin 27 is bifurcated as at 28. The upper flattened end 29 of a push rod 30 is adapted to freely pass into the bifurcation in the outer end of pin 27. This push rod 30 has an opening in its upper end and a pin 31 passes through this opening and aligning openings in the outer end of the pin 27 to pivotally connect the upper end of rod 30 to the pin 27. The slot in the outer end of pin 27 is sufficiently wide to permit free swinging movement of the upper end of the rod 30 therein so that there will be no danger of binding. Also, the opening in the upper end of this rod is preferably slightly larger than the diameter of the pin 31 to eliminate any chance of binding. The pin 31 has a loop 32 bent upwardly and then downwardly around the pin 27, as indicated in Figure 2, to prevent the pin 31 from slipping out of the holes in the upper end of rod 30 and the outer end of pin 27.

The lower end of the rod 30 has a weight 33 held thereon in a suitable manner. This weight is reduced in diameter at its lower portion as indicated at 34 and has an annular flange 35 adjacent its lower end. The rod extends through the weight and a point 36 is formed on the extreme lower end thereof. This point fits into a cup 37 formed in the upper end of a bearing member 38. The bearing member 38 is threaded upwardly through a threaded opening 39 formed in a flattened portion 40 of the beam extension 7. This bearing 38 may be vertically adjusted in the beam extension and held in position by a lock-screw 39a threaded laterally into beam extension 7. A pin 41 has its lower portion extending through an opening formed in the beam extension and is vertically adjustable therein being held in adjusted position by a set-screw. The upper end of this pin is bent at right angles as at 42. The portion 42 of the pin projects over the flange 35 on weight 33 and is normally spaced slightly thereabove. However, it is adjusted sufficiently close to prevent the point 36 from jumping from the cup 37 if the scale is jarred excessively. The portion 42 normally during operation of the scale does not touch the flange 35.

It will be apparent that the rod 30 has its upper end pivotally connected to pin 27 of the indicating mechanism but its lower end rests in a cup bearing and is held therein merely by a gravity force so that it is free to adjust itself automatically in order that the pin will always be properly located in the cup. Even if the rod is twisted or is bowed longitudinally, the point 36 will automatically position itself properly in the cup 37. The pin is loose in the cup so that this automatic adjustment may readily occur. The angle of taper of the pin 36 is considerably less than the angle of taper of the bottom of the cup, as indicated. Even if the pin 27 on the indicator is not in line with the bearing member 38 on the beam extension, the accuracy of the scale will not be affected since the point will automatically adjust itself in the cup. The point is merely held in the cup by a gravity force and floats in the cup so that it will adjust itself to take care of various circumstances.

As previously stated, the indicating pointer is balanced. Therefore, the weight of the rod 30 together with the weight of the weight 33 will tend to keep the point 36 in the cup 37. The weight 20 on the indicator pointer is provided with a longitudinal slot 43 so that this weight will never contact with rod 30 during swinging of the pointer. The upper leg 11 of the yoke 10 will not interfere with movement of rod 30, since the main portion of this leg is offset relative to the portion 9 of the extension 7 of the beam. The bearing 38 may be initially adjusted vertically until the point 36 is properly seated in cup 37 and until the pointer points to balanced position on chart 19.

In operation of the scale, the two flexes 13 will resist movement of the beam away from balanced position as previously described. However, if the weights on platform 5 are heavier than the commodity on the platform 4, the beam will move downwardly. The indicator pointer being balanced, the weight of the rod 30 together with the weight 33 will cause the rod to follow the beam downwardly and will maintain the point 36 firmly seated in the cup 35 by a gravity force. Thus, although the lower end of the rod 30 is not actually connected to the beam extension, it will readily follow said beam extension downwardly due to the gravity force. Since the flexes exert their resistance directly on the beam extension and since the indicator pointer is balanced, there need be no great pull on the lower end of the rod to cause it to follow the beam extension downwardly. The weight of the rod together with the weight 33 will be ample to cause the lower end of the rod to follow the beam extension downwardly and, consequently, to cause the indicator pointer 18 to move over into the underweight indicating area of the chart 19.

If the commodity on platform 4 weighs more than the weights on platform 5, the extension on the beam will move upwardly. This will cause a thrust to be exerted on the lower end of the rod 30 causing the point 36 to be firmly seated in the cup 37. This will also cause the indicator pointer to swing about its pivot point causing it to travel over into the overweight indicating area of the chart 19.

During operation of the scale there will be no "play" in the connection between the beam and the indicating mechanism. If the extension of the beam is moving upwardly or is moving downwardly, the point 36 will always be seated firmly in the cup 37, being held therein by a gravity force. Also, even though the opening in the upper end of the rod 30 is larger than pin 31, during upward movement of the beam the lower wall of said opening will contact firmly with said pin while during downward movement of the beam the upper wall of said opening will contact firmly with said pin.

I have described my gravity rod for connecting the beam to the indicating mechanism as being used in combination with the two flexes arranged as indicated. However, instead of the two flexes of the type indicated, I may employ two coil springs which oppose and balance each other or other types of resistance elements.

Figure 4:
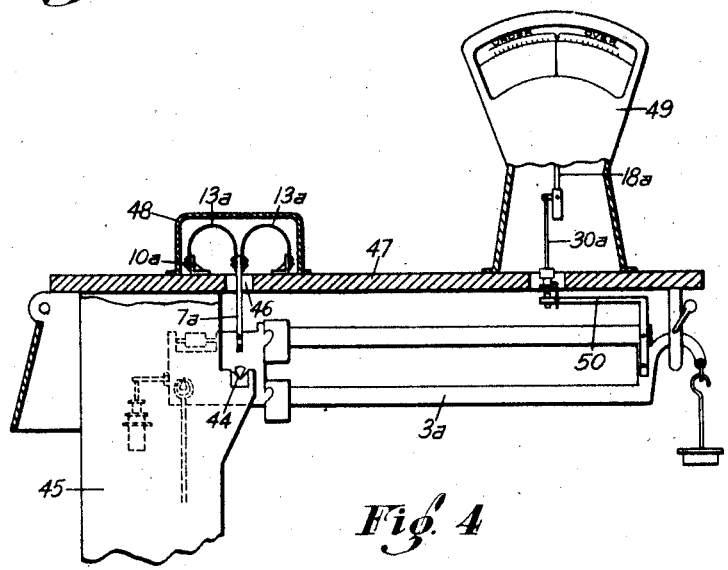
Figure 4 is a front elevational view of part of a scale of the platform type, showing how my novel resistance is applied thereto and also showing my novel means for connecting the beam to the indicator applied thereto.

In Figure 4 I illustrate how the two flexes may be applied to a scale of the platform type in order to resist movement of the beam. I also illustrate how the gravity rod for operatively connecting the beam to the indicator mechanism is applied to such a scale.

Thus, in this figure I show a portion of a platform scale which embodies a movable beam 3a of the usual type which is fulcrumed for swinging movement as at 44 on a supporting tower 45. This beam 3a has an extension 7a rigidly secured thereto. This extension projects vertically at right angles to the beam and is exactly in line with the fulcrum point 44 thereof. The extension 7a projects up through an opening 46 formed in a supporting plate 47 mounted on the end of tower 45 and which projects therefrom. This opening is sufficiently large to permit swinging of the extension 7a which will occur when the beam moves.

In this instance I provide two flexes 13a identical with the flexes 13 and mounted in a similar manner. One end of each of these flexes is connected to the beam extension and the opposite end to a yoke member 10a positioned on the upper surface of the plate 47 in a manner similar to that previously described. These flexes, as before, oppose and balance each other when the beam is in balance. They operate in practically the same manner as the flexes 13 previously described.

It will be apparent that since the extension 7a is in line with the fulcrum point 44 of the beam and since the flexes 13a are arranged on opposite sides of the upper end of the extension as indicated, the flexes 13a will resist movement of the beam away from balanced position. When the beam does move away from balanced position, the extension 7a will swing to one side but this swinging movement of the extension will be resisted by one of the flexes 13a. The flexes 13a are covered by a housing 48.

Indicating mechanism 18a exactly like that previously described is supported in housing 49 supported on the plate 47. The outer end of beam 3a is provided with an arm 50 which is rigidly secured thereto. This arm 50 is operatively connected to the indicating mechanism 18a by a gravity rod 30a and associated members and since this connecting mechanism is identical with that previously described further description thereof is not thought to be necessary.

It will be apparent from the above description that I have provided a scale having a resistance element which is possessed of many desirable characteristics which have been brought out in the previous discussion. Also, I have provided means for connecting the beam to the indicating mechanism which has many desirable features previously discussed. Furthermore, both of these devices are of such a nature that they cooperate with each other in producing a scale which will weigh accurately even after it has been used for a considerable length of time.

Having thus described my invention, what I claim is:

1. A weighing scale comprising a movable beam, a resistance for resisting movement of said beam away from balanced position, said resistance comprising a pair of flexes formed of strips of flexible metal bowed into substantially U-shape, one of said flexes being arranged above said beam and the other being arranged below said beam, one end of each of said U-shaped flexes being attached to the beam and the other end of each of said springs being attached to a support independent of said beam, the attaching means at one end of each of the flexes being adjustable, said flexes opposing and balancing each other when the beam is in balanced position, an indicating pointer for indicating the position of said beam pivotally mounted and arranged above the level of said beam, said indicating pointer being balanced, means for operatively connecting said beam to said indicating pointer, said means comprising a push rod which has its upper end pivotally connected to said pointer, said rod extending to a point where it will be operated by the beam, and a point and cup bearing between the lower end of the rod and said beam, the point being held in said cup by a gravity force only so that it will automatically adjust itself.

2. A weighing scale comprising a movable beam, a resistance for resisting movement of said beam away from balanced position, said resistance comprising a pair of flexes formed of strips of flexible metal bowed into substantially U-shape, one of said flexes being arranged to resist movement of said beam in one direction and the other being arranged to resist movement of said beam in an opposite direction, one end of each of said U-shaped flexes being attached to the beam and the other end of each of said flexes being attached to a support independent of said beam, said flexes opposing and balancing each other when the beam is in balanced position, an indicating pointer for indicating the position of said beam arranged above the level of said beam, said indicating pointer being balanced, means for operatively connecting said beam to said indicating mechanism, said means comprising a rod which has its upper end connected to said pointer, said rod extending to a point where it will be operated by the beam, and a point and cup bearing between the lower end of the rod and said beam, the point being held in said cup by a gravity force only so that it will be free to automatically adjust itself.

3. A weighing scale comprising a movable beam, a resistance for resisting movement of said beam away from balanced position, said resistance comprising a pair of flexes formed of strips of flexible metal bowed into substantially U-shape, one of said flexes being arranged above said beam and the other being arranged below said beam, one end of each of said U-shaped flexes being attached to the beam and the other leg of each of said flexes being attached to a support independent of said beam, the attaching means at one end of each of said flexes being adjustable, said flexes opposing and balancing each other when the beam is in balanced position.

4. A weighing scale comprising a movable beam, a resistance for resisting movement of said beam away from balanced position, said resistance comprising a pair of flexes formed of strips of flexible metal bowed into substantially U-shape, one of said flexes being arranged above said beam and the other being arranged below said beam, one end of each of said U-shaped flexes being attached to the beam and the other end of each of said flexes being attached to a support independent of said beam, said flexes opposing and balancing each other when the beam is in balanced position.

5. A weighing scale comprising a beam fulcrumed for suitable movement, an extension on the beam disposed in alignment with the fulcrum point thereof and projecting from the beam, and resilient members on opposite sides of the extension which oppose movement of the beam away from balanced position and which oppose and balance each other when the beam is in balanced position.

6. A weighing scale comprising a beam fulcrumed for suitable movement, an extension on the beam disposed in alignment with the fulcrum point thereof and projecting from the beam, and a resistance for resisting movement of said beam away from balanced position, said resistance comprising a pair of flexes formed of strips of flexible metal bowed into loop formation, said flexes being arranged on opposite sides of said extension and opposing and balancing each other when the beam is in balanced position.

7. A weighing scale comprising a movable beam, a resistance for resisting movement of said beam away from balanced position, an indicating pointer for indicating the position of said beam arranged above the level of said beam, said indicating pointer being balanced, means for operatively connecting said beam to said indicating pointer, said means comprising a push rod which has its upper end pivotally connected to said pointer, said rod extending to a point where it will be operated by the beam, a point and cup bearing between the lower end of the rod and said beam, the point and cup being free from each other so that they may automatically adjust themselves relative to each other, and a weight on the lower end of said rod for maintaining the point in said cup by a gravity force only.

8. A weighing scale comprising a movable beam, a resistance for resisting movement of said beam away from balanced position, an indicating pointer for indicating the position of said beam and arranged above the level of said beam, said indicating pointer being balanced, means for operatively connecting said beam to said indicating pointer, said means comprising a rod which has its upper end connected to said pointer, said rod extending to a point where it will be operated by the beam, and a point and cup bearing between the lower end of the rod and said beam, the rod and beam being free from each other and the point and cup being held in cooperative relation by a gravity force only so that they will be free from each other and will automatically adjust themselves relative to each other.

9. A weighing scale comprising a movable beam, a resistance for resisting movement of said beam away from balanced position, said resistance comprising a plurality of separate flexes formed of strips of flexible material bowed into substantially U-shape, certain of said flexes being arranged so as to oppose movement of the beam in one direction and certain of said flexes being arranged so as to oppose movement of the beam in an opposite direction, each of said U-shaped flexes having one end connected to said beam and the other end connected to a support independent of the beam, said flexes being so arranged that they oppose and balance each other when the beam is in balanced position.

10. A weighing scale comprising a movable beam, a resistance for resisting movement of said beam away from balanced position, said resistance exerting its resistance force directly on the beam and being a balanced force when the beam is in balanced position, indicating mechanism for indicating the position of said beam, said indicating mechanism being balanced and being free of any resistance element other than that exerting its force directly on the beam, means other than the resistance element for operatively connecting said indicating mechanism to said beam, said means comprising a rod extending from said indicating mechanism to said beam member, one end of said rod being free, said resistance being so arranged that it exerts its resistance force directly on the beam member without the aid of said indicating mechanism and said connecting rod.

11. A weighing scale comprising a movable beam, a resistance for resisting movement of said beam away from balanced position, said resistance exerting its resistance force directly on the beam and being a balanced force when the beam is in balanced position, indicating mechanism for indicating the position of said beam, means other than the resistance for operatively connecting said indicating mechanism to said beam, said means comprising a rod extending from said indicating mechanism to said beam member, one end of said rod being free, said resistance being so arranged that it exerts its resistance force directly on the beam member without the aid of said indicating mechanism and said connecting rod.

12. A weighing scale comprising a movable beam, a resistance for resisting movement of said beam away from balanced position, said resistance comprising flexes formed of strips of flexible metal bowed into loop formation and disposed so that they resist movement of the beam away from balanced position, the flexes opposing and balancing each other when the beam is in balanced position, indicating mechanism for indicating the position of said beam, and means other than said resistance for operatively connecting said indicating mechanism to said beam, said flexes being so arranged that they exert their resistance force directly on the beam without the aid of said indicating mechanism and said connecting means.

13. A weighing scale comprising a movable beam member, a resistance for resisting movement of said beam away from balanced position, indicating mechanism comprising an indicating member for indicating the position of said beam member, means other than said resistance for operatively connecting said members together, said means comprising a rod extending from one of said members to the other, one end of said rod being free from said member disposed at said end thereof, said end of said rod and said member being held in cooperative relation by a gravity force only.

14. A weighing scale comprising a movable beam, a resistance for resisting movement of said beam away from balanced position, said resistance comprising a pair of flexes formed of strips of flexible material bowed into loop formation, one of said flexes opposing movement of said beam in one direction and the other opposing movement of said beam in the other direction, each of said flexes being attached to the beam and to an immovable support independent of said beam, said flexes opposing and balancing each other when the beam is in balanced position.

15. A weighing scale comprising a movable beam, a resistance for resisting movement of said beam away from balanced position, said resistance comprising a plurality of flexes formed of strips of flexible material bowed into loop formation, certain of said flexes opposing movement of said beam in one direction and certain of said flexes opposing movement of said beam in the opposite direction, each of said flexes being connected to the beam and to an immovable support independent of said beam, said flexes opposing and balancing each other when the beam is in balanced position.

16. A weighing scale comprising a movable beam, a resistance for resisting movement of said beam away from balanced position, said resistance including a flex formed of a strip of flexible metal bowed into loop formation, said flex being connected to said beam and to an immovable support independent of said beam, said flex opposing movement of said beam in one direction away from balanced position.

THOMAS B. FLANAGAN.